(12) United States Patent
Kelly

(10) Patent No.: US 7,393,023 B1
(45) Date of Patent: Jul. 1, 2008

(54) REMOTE DOOR OPENER

(76) Inventor: Howard L. Kelly, 5328 Poplar Valley Ct., Centreville, VA (US) 20120

( * ) Notice: Subject to any disclaimer, the term of this patent is extended or adjusted under 35 U.S.C. 154(b) by 17 days.

(21) Appl. No.: 11/405,118

(22) Filed: Apr. 17, 2006

(51) Int. Cl.
 *E05C 1/06* (2006.01)
(52) U.S. Cl. .................................. 292/144; 292/DIG. 25
(58) Field of Classification Search ............... 292/144, 292/201, 216, DIG. 25 X, DIG. 25
See application file for complete search history.

(56) References Cited

U.S. PATENT DOCUMENTS

| | | | | |
|---|---|---|---|---|
| 4,021,065 A | * | 5/1977 | Geringer | 292/144 |
| 4,216,743 A | | 8/1980 | Cohen | |
| 5,076,625 A | * | 12/1991 | Oxley | 292/341.16 |
| 5,532,521 A | * | 7/1996 | Leininger | 307/10.2 |
| 5,729,198 A | * | 3/1998 | Gorman | 340/539.1 |
| 5,943,888 A | * | 8/1999 | Lawson | 70/278.7 |
| 5,990,579 A | * | 11/1999 | Ricci | 307/117 |
| 6,427,632 B1 | | 8/2002 | Horst et al. | |
| 6,453,847 B2 | | 9/2002 | Brooks | |
| 6,595,564 B1 | * | 7/2003 | Hanchett et al. | 292/341.16 |
| 6,710,714 B2 | | 3/2004 | Conway | |
| 6,874,830 B2 | * | 4/2005 | Bashford | 292/341.16 |

\* cited by examiner

*Primary Examiner*—Patricia Engle
*Assistant Examiner*—Mark Williams
(74) *Attorney, Agent, or Firm*—Patent & Trademark Services, Inc; Joseph H. McGlynn

(57) ABSTRACT

An apparatus for remotely opening a door of an enclosure. The apparatus has a linear solenoid connected to a latch on the enclosure. The solenoid is connected to an electrical outlet and the outlet is operated by a remote control.

3 Claims, 1 Drawing Sheet

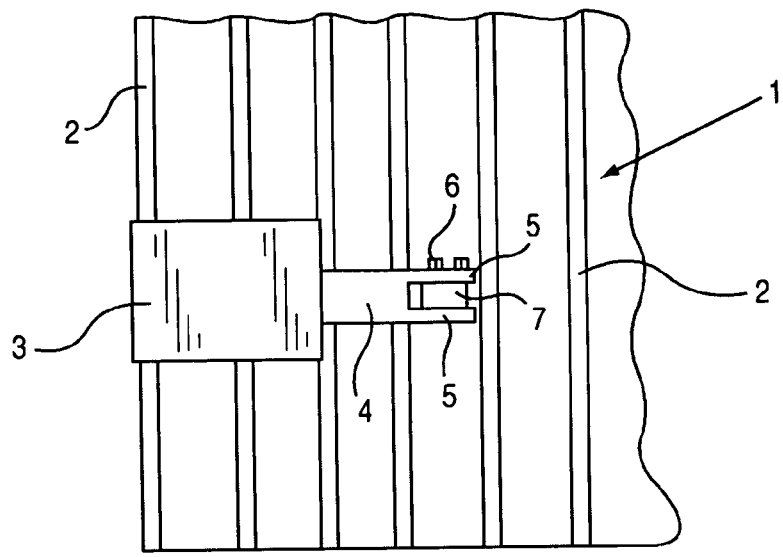
FIG. 1
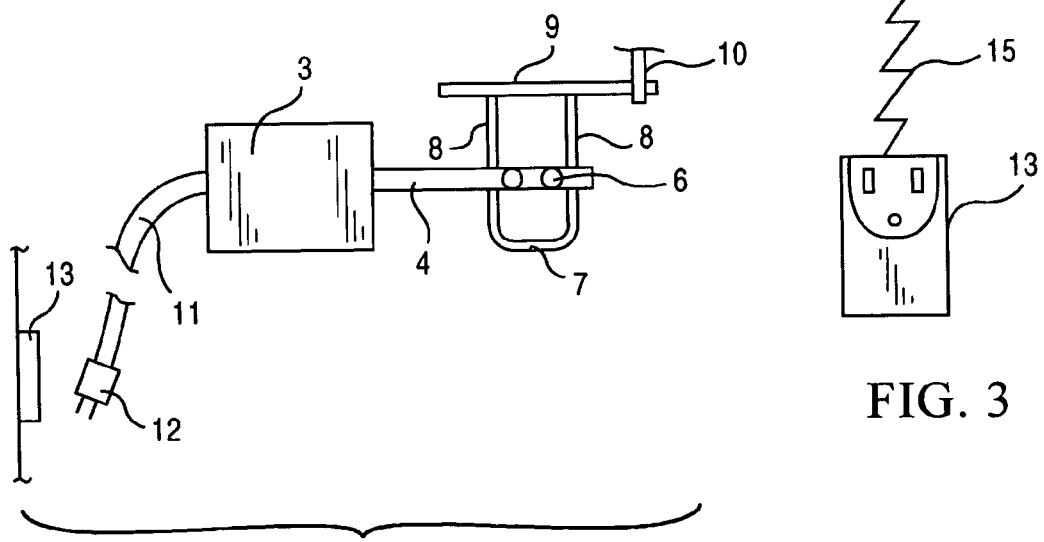
FIG. 2
FIG. 3

REMOTE DOOR OPENER

BACKGROUND OF THE INVENTION

This invention relates, in general, to cages of the type typically used to transport and house pets such as dogs and cats, and, in particular, to structure to allow the pet to exit the cage from a remote location.

DESCRIPTION OF THE PRIOR ART

In the prior art various types of pet devices have been proposed. For example, U.S. Pat. No. 6,710,714 to Conway discloses a cage locking system that unlocks on command from a remote smoke detector.

U.S. Pat. No. 6,453,847 to Brooks discloses an electromagnetically controlled pet door whose mechanism is operated by magnet on the pets collar.

U.S. Pat. No. 4,26,743 to Cohen discloses a pet door that is locked from opening in one direction by a linear solenoid.

U.S. Pat. No. 6,427,632 to Horst et al discloses a remote control apparatus for a gate which rotates a plate with an attached yoke to capture the lower rail of a gate.

SUMMARY OF THE INVENTION

The present invention is directed to an apparatus for remotely opening a door of an enclosure. The apparatus has a linear solenoid connected to a latch on the enclosure. The solenoid is connected to an electrical outlet and the outlet is operated by a remote control.

It is an object of the present invention to provide a new and improved device for remotely opening a door of an enclosure.

It is an object of the present invention to provide a new and improved device for remotely opening a door of an enclosure which uses common elements.

It is an object of the present invention to provide a new and improved device for remotely opening a door of an enclosure which can be easily and quickly retrofitted to an existing enclosure or incorporated into an enclosure being built.

These and other objects and advantages of the present invention will be fully apparent from the following description, when taken in connection with the annexed drawings.

BRIEF DESCRIPTION OF THE DRAWINGS

FIG. 1 is front view of the present invention attached to a pet cage.

FIG. 2 is a top view of the present invention.

FIG. 3 is a schematic view of a RF control module and transmitter used with the present invention.

DESCRIPTION OF THE PREFERRED EMBODIMENT

Referring now to the drawings in greater detail, FIG. 1 shows a partial view of a pet cage 1 made up of a plurality of bars 2, some of which form a door to allow the pet to enter and exit the cage. The frame portion of the enclosure has a keeper 10 to receive a bolt 9 as will be explained below. It should be noted that while an enclosure made from bars is illustrated in the drawings, the invention could be used with enclosures of any shape or material. The frame of the enclosure has a latch keeper 10 (see FIG. 2) which is mounted on the door (not shown in FIG. 1 for clarity). The keeper has an aperture to receive a bolt 9 which is mounted on the door itself. When the bolt 9 is engaged with the keeper the door can not be opened. When the bolt 9 is disengaged from the keeper the door can be opened. Up to this point the cage, keeper and bolt are conventional pet cage items and, therefore, no further explanation is needed or will be given.

The conventional cage must be opened manually, however, at certain times it is inconvenient to open the cage door manually. At such times it would be convenient to be able to unlatch the door of the cage from a remote location. The present invention is designed for such occasions.

A bolt 9 has a U-shaped mounting structure attached thereto by any conventional method. The U-shaped mounting structure has two arms 8 which are secured to the bolt 9. The arms 8 are joined by a base 7. The arms 8 are trapped in a slot between the arms 5 by means of any conventional threaded fasteners 6, as shown in FIG. 1. The slot is formed on the end of a linear solenoid 4. The solenoid 4 is secured within a control box 3 which has an electrical cord 11 with a conventional plug 12 on the end. The plug 12 will be plugged into a control module 13 shown in FIGS. 2 and 3, and the function of which will be explained below.

The control box 3 and solenoid 4 are conventional and operate when electricity is supplied to the control box. When electricity is supplied, the solenoid is pulled into the box 3. An electrical relay is incorporated within the control box 3 with a timer that removes power to the solenoid after approximately ½ second to prevent damage to the solenoid if left on. When electricity is removed, the solenoid is de-energized and no longer applies force in either direction to the bolt 4. In the free state the bolt 9 can be moved in either direction, i.e. latching or unlatching the cage door manually as much as desired. During this situation the cage can be used as before the alteration. Since, these items are conventional no further explanation is needed or will be given.

The control module 13 is a Radio Frequency (RF) control module. RF remote controls are used for a variety of items and work by receiving signals via radio signals. The typical frequency is around 400 MHz, but other frequencies can be used. A special digital coding system is used to separate one system from another. A code is set on the transmitter and the same code is set on the receiver module. When the transmitter sends out a radio signal, if the receiver module is set at the correct frequency, the receiver module performs its programmed operation. By plugging a device into a receiver module, the device can be controlled by sending a signal from the transmitter. Existing electrical wiring between outlets in different areas of a building can also be used in conjunction with multiple control modules to greatly extend the operational working distance (between the remote transmitter and the outlet to be ultimately controlled) beyond that achievable by the original RF signal itself.

The control module 13, used in the present invention, is essentially a switch. The module will be plugged into a conventional AC outlet. Normally, the module prevents any electricity from reaching the plug 12. When a signal is sent from the transmitter 14 to the module 13 by a radio signal 15, as shown in FIG. 3, the module turns on and passes electricity through the module into any device which is plugged into the module. In essence it is the same as turning on a conventional light switch. similarly, as with a light switch, the transmitter 14 can send an "off" signal 15 to the module 13 to reset it to its "normal" state.

In order to operate the present invention, the box 3 will be attached to the cage 1 by any conventional means such as, but not limited to, threaded fasteners. The solenoid 4 with the bolt 9 attached to the slot in the solenoid by means of the fasteners 6 will be positioned so the bolt 9 will engage the keeper 10 when the solenoid is in its extended position, as shown in FIG. 2. In this position the door of the cage will be locked.

Under typical operation, the pet may be put into or let out of the cage, pen or kennel as many times as desired using the standard manual means of operating the latch throughout the day. When a user wants to open the door so that the pet can leave the cage, pen or kennel from a remote location they would activate the transmitter 14 which will send a radio signal 15 to the receiver module 13. The receiver module 13 would allow electricity to pass to the plug 12 and then on to the control box 3 which would pull the solenoid 4 to the left in FIG. 2. This will disengage the bolt 9 from the keeper 10 which will unlatch the door and allow the pet to exit the cage.

The relay within the control box 3 will leave the solenoid de-energized so the bolt 9 may be freely moved manually to the locked or unlocked position. At any time before the user wishes to open the door remotely again he need only re-set the signal receiving control module 13 to the "off" state by using the remote control 14 to send an "off" signal 15 to it, making it ready for the next use to remotely open the door.

In addition to the above described application where neither the solenoid nor the door are "spring loaded" to retract when force is removed, another means of usage allowing also remote locking of the door is attainable by using a standard "spring loaded" solenoid ands applying a common spring to the cage door to pull it closed again after the pet has passed through it (upon the user remotely opening it with the present invention). After the door returns to the closed position, the bolt 9 aligns with the keeper 10 again.

Therefore, if a spring loaded solenoid is used that has a "normal" position of extended, where "normal"=de-energized=moved there by its internal spring whenever no force is applied by an electrical charge, when the transmitter 14 sends an "off" signal 15 to the control module 13 the door will relock itself by bolt 9 entering keeper 10 rather than remaining "free" or "loose" for manual operation, as described above. With this secondary application the cage can be unlocked or locked by the remote transmitter 14. By training the pet to go into its cage on its own when verbally commanded to do so through a second simple "flap" type door that allows only entrance into, but not exit from, the enclosure, the pet can be both remotely secured and released.

Also, both the "primary/free motion" and "secondary/spring loaded" applications described here can be used to control pet traffic through a standard "flap" type pet door when mounted in a typical installation within a door to the outside of the house, separating rooms, etc. The "flap" door in this case would swing in both directions, and be gravity-moved to its normal down position, where it is held in place via magnetic attraction between the main door and the "flap" door.

Whereas the prior art describes inventions whereby the pet can have free control of its exiting and entering via various devices mounted within its collar, often it is desired that the owner/user controls the pet's motions in or out and to change the pet door between locked or unlocked remotely. The application of the present invention in its "spring loaded" solenoid form affords this control simply by considering the flap door as the cage door, gravity as the door spring and the main door frame as the cage door frame, with the solenoid rod becoming the bolt 9 when the solenoid is mounted to the main door and the flap door incorporates a keeper 10 on it that maybe engaged by the bolt 9 when the flap door is in its fully down position.

Although the Remote Door Opener and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention. For example, the present invention could be used to open enclosures beside pet enclosures such as, but not limited to, gates at the ends of driveways, kennels, or retaining pens.

What I claim as my invention is:

1. An apparatus for unlocking an enclosure from a remote location, said apparatus comprising:
   a keeper,
   means for mounting said keeper on a door of said enclosure,
   a bolt,
   means for mounting said bolt on another portion of said enclosure,
   means on said keeper for receiving said bolt, thereby latching said door of said enclosure with said another portion of said enclosure,
   said bolt secured to a single solenoid, and
   said single solenoid has an electrical wire electrically and mechanically connected thereto at one end, and
   said electrical wire has an electrical plug electrically and mechanically connected at a second end of said electrical wire,
   a control module detachably connected to a source of electricity,
   said control module has means for electrically and mechanically receiving said electrical plug, and
   wherein said control module is a receiver, and
   said control module is activated by a transmitter, and
   said transmitter is connected to said source of electricity that said control module is connected to,
   said single solenoid moves from a first position to a second position,
   when in said first position said solenoid is turned on and said door is latched by said keeper receiving said bolt, and
   when in said second position said solenoid is turned off and said door is unlatched, and
   when said control module is activated by said transmitter, said solenoid is turned off and moves from said first position to said second position, and
   wherein said single solenoid has a first end positioned within said control module and a second end positioned outside said control module, and
   said end positioned outside said control module has means for securing it to said bolt, and
   wherein said means for securing said end positioned outside said control module to said bolt comprises a pair of arms on said end positioned outside said control module, and
   means engaging said pair of arms to secure said bolt between said arms.

2. The apparatus for unlocking an enclosure from a remote location as claimed in claim 1, wherein said solenoid has a slot in one end, and
   said bolt has an extension secured in said slot.

3. The apparatus for unlocking an enclosure from a remote location as claimed in claim 2, wherein said extension is U-shaped.

* * * * *